United States Patent [19]
Boyer et al.

[11] 3,901,429
[45] Aug. 26, 1975

[54] APPARATUS FOR COMPLIANT BONDING
[75] Inventors: John Albert Boyer, Allentown; David Paul Ludwig; Friedrich Zwickel, both of Whitehall, all of Pa.
[73] Assignee: Western Electric Company, Incorporated, New York, N.Y.
[22] Filed: Jan. 17, 1974
[21] Appl. No.: 434,173

Related U.S. Application Data
[62] Division of Ser. No. 249,332, May 1, 1972, Pat. No. 3,800,409.

[52] U.S. Cl. ....................... 228/5.5; 228/6; 228/44; 228/106
[51] Int. Cl.² ...................................... B23K 37/04
[58] Field of Search ............ 228/4, 6, 44; 29/471.1, 29/493, 497.5, 498, 589, 626, 628

[56] References Cited
UNITED STATES PATENTS

| | | | |
|---|---|---|---|
| 3,627,190 | 12/1971 | Ramsey | 228/4 |
| 3,640,444 | 2/1972 | Ludwig | 29/471.1 X |
| 3,696,985 | 10/1972 | Herring et al. | 228/4 |
| 3,771,711 | 11/1973 | Lesyk et al. | 29/471.1 |
| 3,774,834 | 11/1973 | Holler et al. | 29/471.1 X |

*Primary Examiner*—Francis S. Husar
*Assistant Examiner*—Gus T. Hampilos
*Attorney, Agent, or Firm*—R. Y. Peters; P. J. Tribulski

[57] ABSTRACT

A compliant bonder has a single heated tip which is raised and lowered along a bonding axis. The tip is surrounded by a turret which indexes successive portions of a continuous compliant member across the bonding axis. The turret is provided with a series of holes through a rim portion thereof. In order to index the compliant member, after a bond is completed, the turret is lowered to disengage the bonding tip from the hole in the turret. The turret is then rotated to bring the next successive one of the holes onto the bonding axis. Next, the turret is raised to re-engage the tip with the newly positioned hole.

Just prior to and during bonding, the tip is forced to project out through one of the holes that is aligned with the bonding axis. A portion of the compliant member is stretched across the hole in the turret. Thus, the tip engages with the compliant member. The heated bonding tip is prevented from pre-heating the compliant member except immediately prior to and during a bonding operation. Thus, the desirable flow characteristics of the member are retained.

10 Claims, 8 Drawing Figures

APPARATUS FOR COMPLIANT BONDING

This is a division of application Ser. No. 249,332 filed May 1, 1972 now U.S. Pat. No. 3,800,409.

BACKGROUND OF THE INVENTION

1. Field of the Invention

This invention relates to improved apparatus for compliant bonding, and more particularly to apparatus for producing compliant bonds between beam-lead semiconductor devices and metallic patterns on substrates over a wide range of bonding temperatures.

2. Description of the Prior Art

When bonding beam-lead semiconductor articles, such as integrated-circuit chips, to substrates, it is highly advantageous to employ a technique known as compliant bonding. Compliant bonding is described in U.S. Pat. No. 3,533,155 issued to A. Coucoulas on Oct. 13, 1970 and U.S. Pat. No. 3,640,444 issued to D. P. Ludwig on Feb. 8, 1972.

An improvement to the compliant bonding system is disclosed in patent application, Ser. No. 173,447 filed on Aug. 20, 1971 now U.S. Pat. No. 3,771,711, in the names of J. N. Lesyk, D. P. Ludwig and J. J. Monahan and is assigned to the assignee of record of this application. In the Lesyk et al. system, a single heated bonding tip is engaged with the compliant member only after a desired portion of the compliant member is in a bonding position. Thus, expansion problems associated with undesired heating of a compliant member on a turret are reduced.

While the Ludwig and the Lesyk et al. systems are fully workable, it is desirable to provide bonding apparatus which will operate not only with all of the advantages of these systems, but also will operate with greater accuracy, reliability and through a greater range of temperatures.

SUMMARY OF THE INVENTION

It is therefore an object of this invention to provide a bonding system which will facilitate compliant bonding with a sequentially indexable compliant bonding strip and a single bonding tip where adverse effects of preliminarily heating a compliant bonding strip prior to bonding are substantially eliminated.

This and other objects are achieved by providing a bonding apparatus with a heated bonding tip movable along a bonding axis. A desired portion of a compliant member is accurately located on the bonding axis in proximity to, but not in contact with, said heatable bonding tip. The aligned portion of the compliant member is engaged with the bonding tip, for only a brief period, prior to bonding operations so that preheating of the compliant member is limited and the member retains desirable flow characteristics.

An exemplary system of achieving these objects involves utilizing bonding apparatus with a decoupling bonding tip feature. A bonding tip is surrounded by an indexable turret with apertures formed in a rim portion of the turret. A compliant member is indexed on the outer surface of the turret and is held away from contact with the bonding tip until a time immediately prior to occurrence of an actual bonding operation. The bonding tip engages the compliant member through one of the apertures.

BRIEF DESCRIPTION OF THE DRAWINGS

Other objects and features of the present invention will be more readily understood from the following detailed description of specific embodiments thereof, when read in conjunction with the appended drawings in which.

DETAILED DESCRIPTION

A novel bonding head, designated generally by the numeral 20, is illustrated in FIG. 1 through 6. The bonding head 20 is illustrated independently of a bonding machine of which it forms a part. The heat 20 can be used on any one of a number of bonding machines. For example, the head 20 can be used on the machines disclosed on the aforementioned D. P. Ludwig Patent, U.S. Pat. No. 3,640,444 or the J. N. Lesyk et al. application, Ser. No. 173,447.

The purpose of the bonding head 20 is to provide thermocompression bonds between beam-leads of semiconductor devices or chips, designed generally by the numeral 22, and metallic patterns formed on substrates 24. The desired bonding is accomplished by compressing the leads against the metallic pattern with a compliant strip or member 26 as described in U. S. Pat. No. 3,533,155 issued to A. Coucoulas on Oct. 13, 1970 and the above-mentioned D. P. Ludwig Patent and J. N. Kesyk et al. application.

Figure 7:
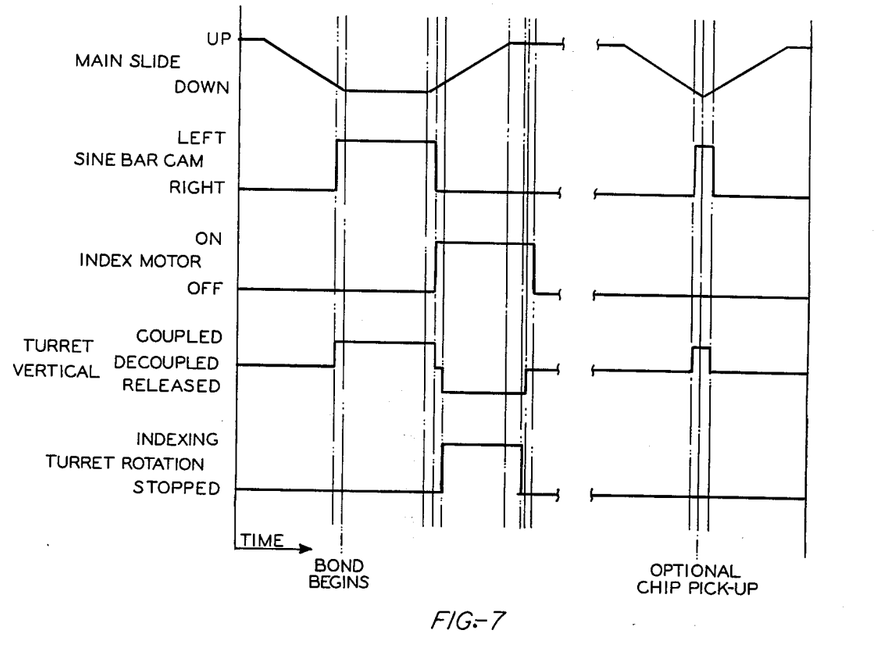
FIG. 7 is a timing chart showing a sequence of operation of various elements of the bonding head of FIG. 1.

The operation of the bonding head 20 can be best understood by referring to FIG. 1 through 6 for the structural aspects and to FIG. 7, a timing chart, for the coordination of various elements of the head.

One can consider a cycle of operation to begin when the head 20 is in a raised position on a main slide unit 28.

Bonding is performed by lowering the head 20 along a bonding axis 30 by applying a downward force through a control arm 32, which is operated through a conventional mechanism of a bonding machine (not shown). The bonding head 20 is lowered along the main slide unit 28 until the chip 22 and the portion of the compliant member 26, which is on the bonding axis 30, are almost in contact with the substrate 24. When the compliant member is approximately 0.125 inch above the substrate 24, a sine bar cam 34 is shifted laterally to the left (see FIG. 3) by a shifting cam 36. The movement of the cam 34 permits a drum or a turret, designated generally by the numeral 38, to move upwardly on the head 20. The upward motion of the turret 38 causes the compliant member 26 to become engaged with a heated bonding tip 40 (see FIG. 4). Downward motion of the bonding head 20 is continued until the chip 22 contacts the substrate 24.

It should be noted that for almost the entire time period that the chip 22 is on the bonding axis 30, the heated bonding tip 40 and the compliant member 26 are not in contact with each other. The bonding head 20 moves at a linear rate of approximately 2 inches per second. Consequently, the time period, prior to bonding, during which there is engagement between the bonding tip 40 and the compliant member 26 is less than 0.2 second. By adjusting the vertical position of the shifting cam 36, the time of engagement may even be as low as 0.05 second. Due to the brevity of preliminary engagement of the bonding tip 40 with the compliant member 26, there is very little time for the compliant member to experience undesired heating.

Figure 8:
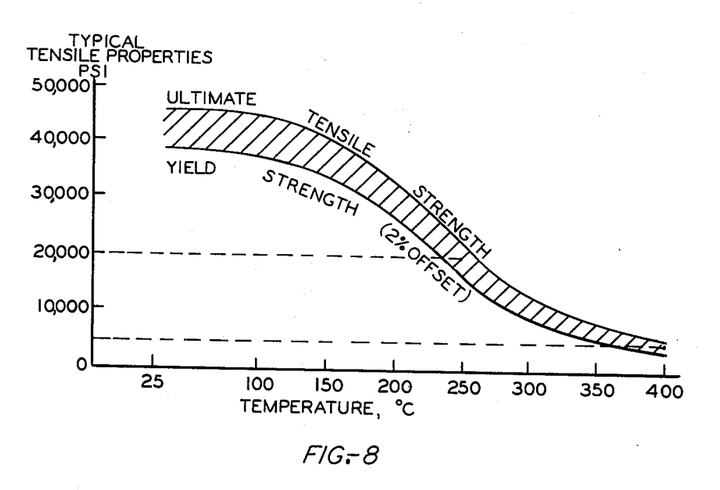
FIG. 8 is a graphical display of some strength characteristics of compliant material as a function of temperature illustrating an advantage of the inventive bonding head of FIG. 1.

It is particularly advantageous to prevent pre-heating of the compliant member 26 prior to a bonding operation. Referring to FIG. 8, one can see that the strength properties of a typical compliant member diminish substantially with increasing temperature and, therefore, the member deforms more easily at higher temperatures, i.e., becomes soft. FIG. 8 is a graphical representation of the ultimate tensile strength and the yield strength of alloy 2024-F aluminum. In most compliant bonding situations, it is good practice to use a material which is capable of transmitting a bonding pressure of 60,000 psi. In other words, the midpoint between ultimate strength and yield strength should be about 20,000 psi since bonding pressure is approximately three times the yield strength. With alloy 2024-F aluminum, the desired 20,000 psi strength exists at temperatures lower than 250°C. As the compliant member is raised to temperatures above 250°C prior to bonding, there is a distinct probability that the compliant member will not be capable of placing the necessary pressure on the leads of the chip 22.

In order to achieve sound bonds on substrate with precision resistors and capacitors which cannot tolerate excessive pre-heating, it is often necessary to raise the temperature of the bonding tip 40 to approximately 400°C. Obviously, this temperature is far in excess of the 250°C that the compliant member can tolerate without serious adverse effects on its flow characteristics. The inventive decoupling feature of the bonding head 20 permits the heretofore unobtainable result of operating a bonding tip at 400°C, while not raising the temperature of a compliant member above 250°C prior to bonding. The decoupling feature of the head 20 provides a gap of at least 0.002 inch between the bonding tip 40 and the compliant member 26 until a fraction of a second before the bonding operation begins. The very brief time during which the tip 40 and the member 26 are in contact, is not sufficient for the member to become undesirably heated above 250°C.

After bonding is completed, the control arm 32 is moved upwardly to permit the bonding head 20 to rise. As the bonding head 20 is raised upwardly, the sine bar cam 34 is shifted to the right so that the bonding tip 40 is disengaged or decoupled from the compliant member 26. The bonding head 20 rises to the position shown in FIG. 1.

The portion of the compliant member 26 which was on the bonding axis 30 during the bonding, must now be removed from the bonding axis and replaced with a fresh portion of the compliant member. The replacement of a spent portion of the compliant member 26 is accomplished by indexing the turret 38.

During the upward rise of the bonding head 20, a motor 46 is turned on and begins driving a belt 48. The belt 48 is engaged with a cam 50 which is attached to a block 52 supporting the turret 38. As the cam 50 rotates, it is urged against a cam follower 54 and the block 52 is moved downwardly on the bonding head 20. The position of the bonding tip 40 with respect to the bonding head 20 remains fixed. Thus, the turret 38 is moved downwardly with respect to the bonding tip 40. This downward movement is sufficient to make the bonding tip 40 free of an aperture 56 formed in a rim 58 of the turret 38.

After the bonding tip 40 is clear of the aperture 56, further rotation of the motor 46 releases a lock mechanism 62 and indexes the turret 38 through a geneva mechanism 64. After the turret 38 has been indexed 22.5°, the lock mechanism 62 is re-engaged. The turret 38 is provided with sixteen of the apertures 56 through its rim 58 at spacings of 22.5°. Thus, the operation of the geneva mechanism 64 places another one of the apertures 56 directly on the bonding axis 30 through the indexing action.

The compliant member 26 is engaged tightly on the outer surface of the turret 38 with sprocket projections 65 so as to be in non-slipping railing contact with such turret. As the turret 38 indexes, the compliant member 26 also indexes and a fresh portion of the compliant member is brought onto the bonding axis 30 with each indexing. The compliant member 26 is fed from a supply spool 66 and onto a take-up spool 68. The supply spool 66 and take-up spool 68 are provided with slip clutches (not shown) which are indirectly driven by the motor 46. The clutches are overdriven in opposite direction to each other, assuring that tension exists in the compliant member 26 at all times.

Figures 1, 2:
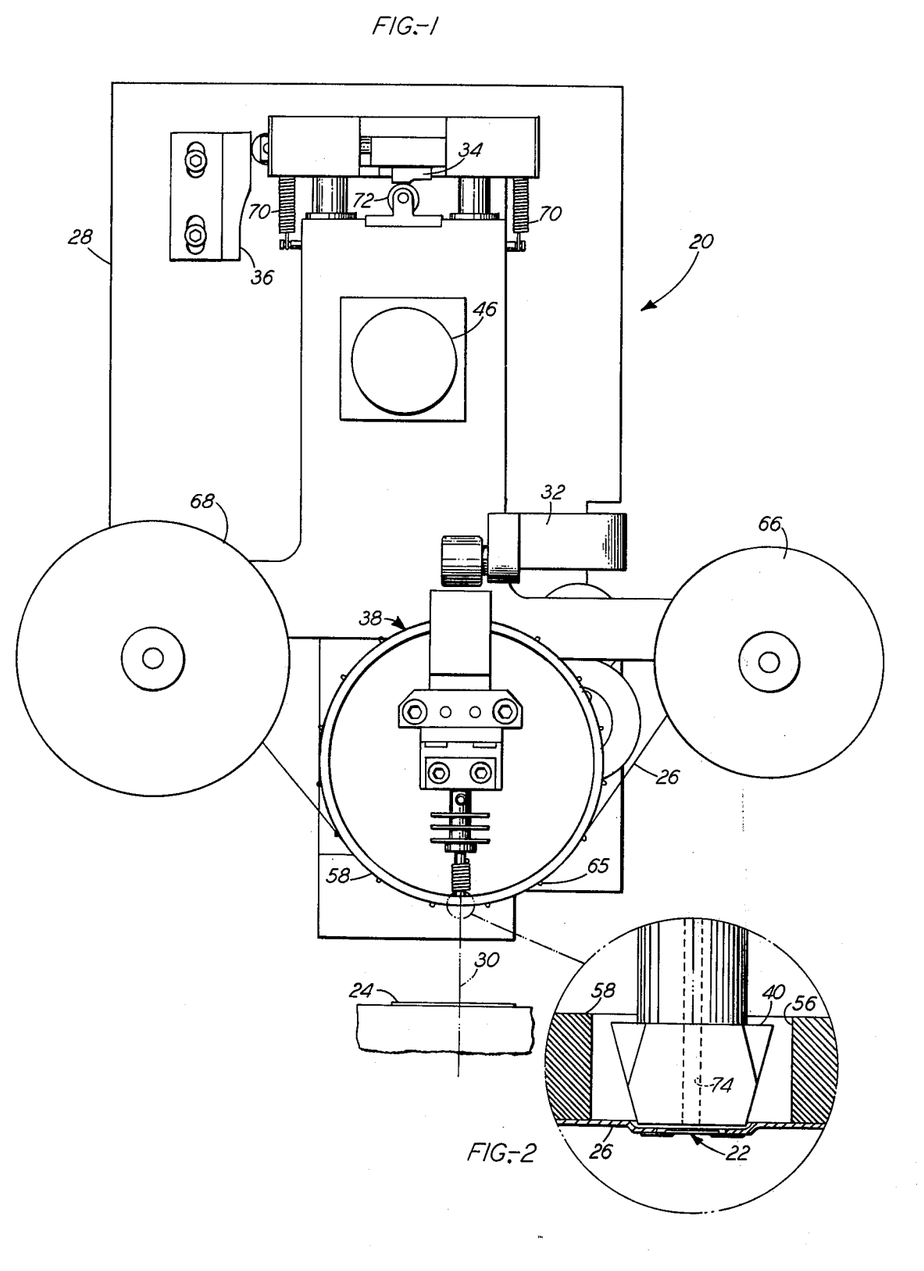
FIG. 1 is a front elevational view of an inventive compliant bonding head in a raised position.
FIG. 2 is an enlarged view of an encircled tip portion of the bonding head of FIG. 1.
Figures 3, 4:
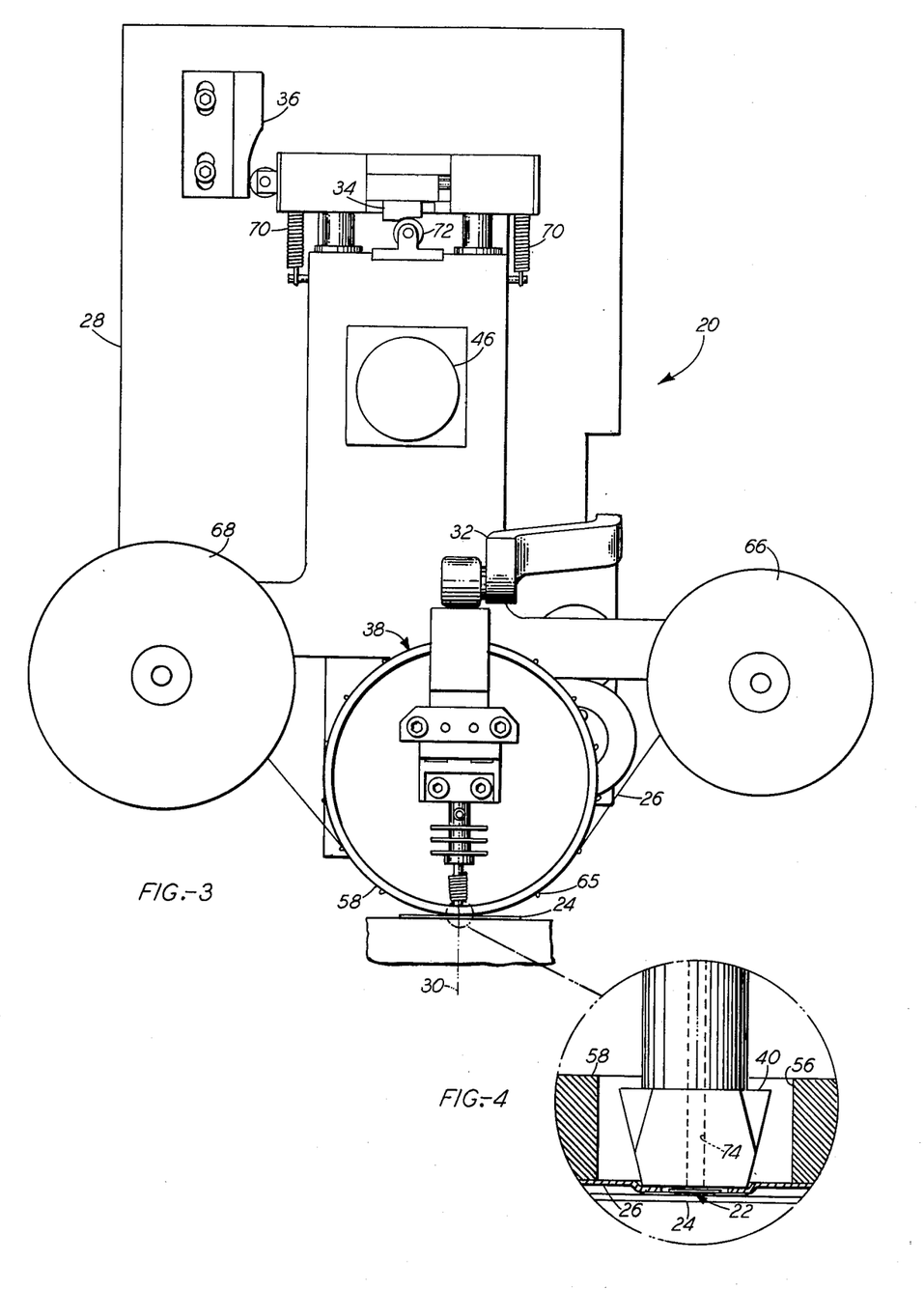
FIG. 3 is a front elevational view of the bonding head of FIG. 1, illustrating an inventive compliant-member bonding operation.
FIG. 4 is an enlarged view of an encircled tip portion of the bonding head of FIG. 3.
Figure 5:
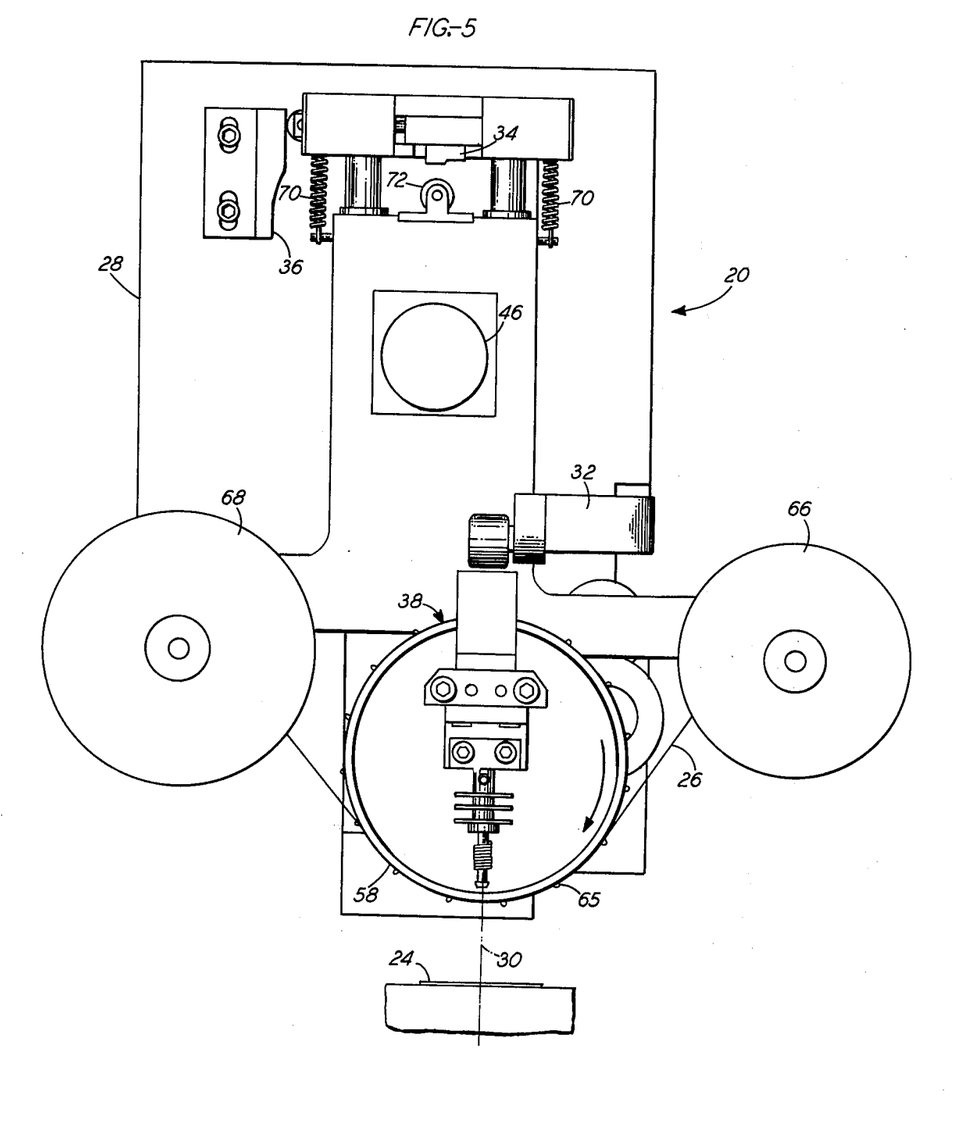
FIG. 5 is a front elevational view of the bonding head of FIG. 1, showing the performance of an indexing operation.
Figure 6:
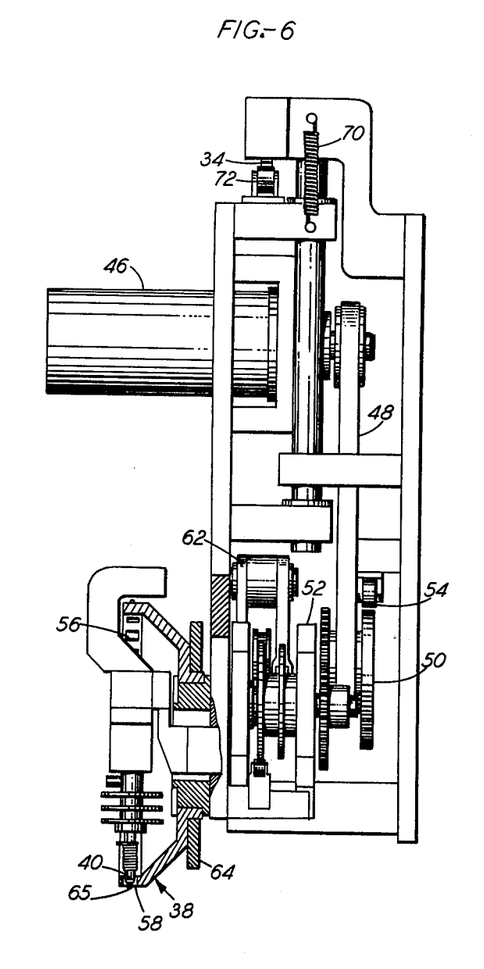
FIG. 6 is a side elevational view of a bonding head of FIG. 1, with portions removed for purposes of clarity.

After another one of the apertures 56 is aligned to the bonding axis 30, the cam 50 permits the turret 38 to move upwardly under the force of extension springs 70. The turret 38 moves upwardly until a cam follower 72 engages with the sine bar cam 34. Since the sine bar cam 34 is now shifted to the right, a clearance exists between the bonding tip 40 and the compliant member 26. The clearance is approximately 0.002 inch as shown in FIG. 2.

The compliant member 26 is accurately positioned on the bonding axis 30, but the undesirable heating of the compliant member 26 by the heated bonding tip 40 does not take place due to the existence of the clearance provided by the sine bar cam 34.

It is possible to operate the head 20 in one of two different modes. First of all, the head 20 can be operated with the compliant member 26 being preloaded with the semiconductor chips 22. A structure for the compliant member 26 and a system for preloading the member is described in patent application, Ser. No. 185,648 filed Oct. 1, 1971 in the names of J. A. Boyer, D. P. Ludwig and F. Zwickel and assigned to the assignee of record of this application.

Alternatively, the head 20 can be operated with the compliant member 26 which is not pre-loaded with the chips 22. In this case, a chip pick-up operation must be performed by the head 20 between each bond cycle.

Chip pick-up is performed by lowering the head 20 along a bonding axis 30 by applying a downward force through the control arm 32. The bonding head 20 is lowered along the main slide unit 28 until the portion of the compliant member 26, which is on the bonding axis 30, is almost in contact with the chip 22, which is to be picked up. When the compliant member is approximately 0.125 inch above the chip 22, the sine bar cam 34 is shifted laterally to the left. The movement of the cam 34 permits the turret 38 to move upwardly on the head 20. The upward motion of the turret 38 causes the compliant member 26 to become engaged with the heated bonding tip 40. The bonding tip 40 is provided with a vacuum port 74.

Downward motion of the bonding head 20 continues until the compliant member 26 contacts the chip 22. Vacuum operating through the port 74 causes the chip 22 to be engaged with the compliant member 26. At this point in time, the control arm 32 reverses direction and permits the head 20 to begin moving upwardly.

After the head 20 has been raised approximately 1/8 inch, the sine bar cam 34 begins shifting to the right, thereby lowering the turret 38 with respect to the tip 40. The lowering action causes the compliant member 26 to be pulled away from the tip 40, but the vacuum force operating through the port 74 is sufficient to retain the chip 22 against the compliant member. The heating of the compliant member 26 which occurs during chip pick-up does not effect the flow characteristics adversely because the compliant membere has an opportunity to cool before bonding occurs. Air flow associated with maintenance of the vacuum force provides desirable cooling of the member 26 and the chip 22.

Although certain embodiments of the invention have been shown in the drawings and described in the specification, it is to be understood that the invention is not limited thereto, is capable of modification and can be arranged without departing from the spirit and scope of the invention.

We claim:

1. Apparatus for compliantly bonding an article to a substrate, which comprises:
   means, including an opening in such means, (a) for effecting non-slipping rolling contact with a compliant member, (b) for positioning at least a portion of the compliant member over the opening and (c) for moving the opening and said portion of the compliant member onto the bonding axis in proximity to, but not in contact with, the heatable bonding tip; and
   means, coupled to the bonding tip, for passing the bonding tip through the opening and for engaging the portion of the compliant member on said axis with the bonding tip to bond the article to the substrate.

2. Apparatus for compliant bonding first articles to second articles, which comprises:
   a heatable bonding tip adapted to move along a bonding axis;
   means, including a member having at least one opening in such member, (a) for effecting non-slipping rolling contact with a compliant strip and (b) for moving the opening in the member, a portion of the compliant strip and one of the first articles onto the bonding axis in proximity to, but not in contact with, said heatable bonding tip; and
   means, coupled to the bonding tip, (a) for passing the bonding tip through the opening of the member and (b) for engaging the bonding tip with said aligned portion of the compliant strip, said engagement being for a limited period of time and being prior to contact of said aligned first article to one of the second articles for bonding, said period being limited to a time insufficient to permit the engaged portion of the compliant strip to become heated to the temperature of the bonding tip, whereby the strip retains desirable strength characteristics.

3. The apparatus of claim 2, wherein the period of time during which the heatable tip is engaged with the compliant member immediately prior to bonding is less than 0.2 second.

4. Apparatus for compliantly bonding a first article to a second article, which comprises:
   a heatable bonding tip;
   supply means for an indeterminate length of compliant bonding material; and
   indexing means for placing successive desired portions of the compliant bonding material from the supply means and in alignment with the heatable bonding tip, said indexing means including a turret adapted to accommodate a portion of the compliant bonding material on an outer surface of the turret, said turret surrounding the heatable bonding tip and having a rim portion with a plurality of apertures formed therein, said apertures being large enough to permit an end portion of the bonding tip to extend therethrough, and said turret also being movable with respect to said bonding tip so that the tip can be placed, when desired, in one of the apertures close to the compliant bonding material, and so that the tip can be removed from the aperture to permit the turret to rotatably index the compliant bonding material after each bonding operation.

5. A decoupling compliant bonding head, which comprises:
   a heatable bonding tip adapted to move along a bonding axis;
   a turret surrounding the bonding tip and having a rim with apertures extending therethrough;
   means for engaging a compliant member against the outer surface of the rim;
   means, coupled to the turret, for indexing and laterally moving it to permit the heatable tip to be inserted into successive ones of the apertures;
   means for selectively maintaining a gap between the insertable bonding tip and the compliant member engaged on the outer surface of the rim of the turret so that a desired portion of the compliant member can be accurately aligned to the bonding axis without being subjected to the adverse effects of being directly heated by the bonding tip, thereby preserving the desired flow characteristics of the compliant member.

6. The apparatus of claim 5, wherein the gap maintained between the bonding tip and the compliant member is at least 0.002 inch.

7. The apparatus of claim 5, wherein the bonding tip is heated to a temperature of about 400°C, but the temperature of the compliant member does not exceed 250°C immediately prior to bonding.

8. The apparatus of claim 5, wherein the gap between the tip and the compliant member is maintained until 0.2 second prior to the compliant member being contacted to a workpiece.

9. An apparatus for compliantly bonding an article to a substrate, wherein a bonding tip is movable along a bonding axis, wherein means are provided for heating the bonding tip, and wherein a compliant member is indexably positioned between the bonding tip and the substrate, which comprises:

a curvilinear member having both a first surface and an opposed second convex surface and having at least one aperture extending through such surfaces, the bonding tip being positioned adjacent to and spaced from the first surface;

means for engaging the compliant member with the convex surface of the curvilinear member;

means, coupled to the curvilinear member, for moving it to locate the aperture on the bonding axis;

means for positioning the substrate adjacent to and spaced from the aperture;

means for positioning the article between aperture and the substrate and spaced from aperture; and means, coupled to the bonding tip, for moving it through the aperture to engage the compliant member and then to force the compliant member against the article to bond it to the substrate.

10. The apparatus of claim 9, wherein the curvilinear member is a drum-like element.

* * * * *

UNITED STATES PATENT OFFICE
CERTIFICATE OF CORRECTION

Patent No. 3,901,429  Dated August 26, 1975

Inventor(s) J. A. Boyer, D. P. Ludwig and F. Zwickel

It is certified that error appears in the above-identified patent and that said Letters Patent are hereby corrected as shown below:

Claim 1, line 46, the following was omitted and should be inserted "a heatable bonding tip movable along a bonding axis;".

Signed and Sealed this twenty-fifth Day of November 1975

[SEAL]

Attest:

RUTH C. MASON
Attesting Officer

C. MARSHALL DANN
Commissioner of Patents and Trademarks